United States Patent [19]
Barr

[11] Patent Number: 6,144,630
[45] Date of Patent: Nov. 7, 2000

[54] PIVOTING MAILBOX FOR OPTICAL STORAGE LIBRARIES

[75] Inventor: Allen Barr, Escondido, Calif.

[73] Assignees: Sony Corporation, Tokyo, Japan; Sony Electronics Inc., Park Ridge, N.J.

[21] Appl. No.: 08/982,013

[22] Filed: Dec. 1, 1997

[51] Int. Cl.[7] ............................. G11B 17/22; G11B 33/04
[52] U.S. Cl. ............................. 369/178; 369/34; 369/75.1
[58] Field of Search ................................ 369/34, 36, 178, 369/191, 192, 75.1, 75.2, 77.1, 77.2; 360/92, 98.04, 98.06

[56] References Cited

U.S. PATENT DOCUMENTS

| | | | |
|---|---|---|---|
| 4,730,291 | 3/1988 | Ikedo et al. | 369/36 |
| 4,730,292 | 3/1988 | Hasegawa et al. | 369/36 |
| 4,878,137 | 10/1989 | Yamashita et al. | 369/36 |
| 5,062,093 | 10/1991 | Christie et al. | 360/92 |
| 5,235,579 | 8/1993 | Ross | 369/178 |
| 5,331,614 | 7/1994 | Ogawa et al. | 369/178 |
| 5,353,269 | 10/1994 | Kobayashi et al. | 369/36 |

FOREIGN PATENT DOCUMENTS

| | | | |
|---|---|---|---|
| 479626 | 4/1992 | European Pat. Off. | 369/178 |
| 1-122064 | 5/1989 | Japan | 369/178 |
| 4-172651 | 6/1992 | Japan | 369/178 |
| 4-291053 | 10/1992 | Japan | 369/178 |

*Primary Examiner*—David L. Ometz
*Attorney, Agent, or Firm*—Limbach & Limbach L.L.P.; Seong-Kun Oh

[57] ABSTRACT

A pivoting mailbox in an optical storage library includes a shaft mounted to a housing, a spring mounted to the shaft, a first gear having teeth along a portion of its outer periphery mounted to the housing, a second gear mounted to the shaft, the second gear having teeth along a portion of its outer periphery configured to couple to the first gear teeth, and a mailbox pivotally mounted to the shaft, the mailbox configured to pivot between the first and second positions in accordance with the bias of the spring upon the second gear. Accordingly, the pivoting mailbox mechanism in the optical storage library in accordance with the present invention requires substantially less number of movable and stationary parts and does not require the use of a dc motor to load and unload individual disc cartridges into and from the optical storage library.

73 Claims, 6 Drawing Sheets

PIVOTING MAILBOX FOR OPTICAL STORAGE LIBRARIES

BACKGROUND OF THE INVENTION

1. Field of the Invention

The present invention relates generally to apparatuses for storing media cartridges. More specifically, the present invention relates to an optical storage library with mass media presentors.

2. Description of the Related Art

Optical discs, magnetic discs and magneto-optical discs are increasingly popular media for digitally storing information. Such discs are typically enclosed in a box shaped disc cartridge having apertures through which a laser light source or magnetic head can read (or write) to the spinning disc contained within the cartridge.

In certain large-scale disc cartridge storage and retrieval systems (sometimes referred to as "jukeboxes"), disc cartridges are stored in one or more racks in an array of storage slots. Commonly, the slots are oriented horizontally and are arranged in a vertical column such that horizontal disc cartridges sit, one on top of another, in the individual slots. Storage and retrieval systems may have one or more such columns of disc cartridge storage slots. This type of system includes a cartridge retrieval mechanism which is movable into position adjacent a slot. The mechanism includes apparatus for grasping a cartridge while in the slot, drawing it out from the slot, holding the cartridge in a sleeve, transporting it to a different location, such as a recording/reading/erasing station, and ejecting the cartridge into that location. Cartridge magazines are normally of rectangular shape with an open side through which disc cartridges are removed and inserted by either a user or a cartridge retrieval system.

Presently, mass media storage and retrieval systems with mailbox designs have many parts and generally require a dc motor to drive the mailbox from a closed position to an open position for loading or unloading the disc cartridges. Thus, conventional designs have higher probability of part failures including failure of the dc motor which would disengage the entire optical disc storage and retrieval system. Additionally, more parts means more weight added to the system, thus substantially hindering transportability of the system.

SUMMARY OF THE INVENTION

In view of the foregoing, the present invention provides a pivoting mailbox for optical disc storage and retrieval system which minimizes part counts and which does not require the use of a dc motor to open or close the mailbox for disc cartridge loading and/or unloading.

According to one embodiment of the invention, an apparatus for storage and retrieval of recording media includes a shaft mounted to a housing; a spring mounted to the shaft; a first gear having teeth along a portion of its outer periphery mounted to the housing; a second gear mounted to the shaft, the second gear having teeth along a portion of its outer periphery configured to couple to the first gear teeth; and a mailbox pivotally mounted to the shaft, the mailbox configured to pivot between said first and second positions in accordance with the bias of the spring upon the second gear.

In accordance with another embodiment of the present invention, the apparatus for storage and retrieval of recording medium further includes a damper coupled to the mailbox configured to dampen the bias of the spring mounted to the shaft.

In accordance with yet another embodiment of the present invention, the apparatus for storage and retrieval of recording medium further includes a stopper mounted on the housing configured to stop the mailbox at the second position.

In accordance with still another embodiment of the present invention, the apparatus for storage and retrieval of recording medium further includes a panel coupled to the apparatus configured to substantially cover the opening on the housing.

Moreover, in accordance with yet another embodiment of the present invention, an apparatus for storage and retrieval of recording medium includes means for receiving a recording medium; means for pivotally mounting said receiving means to a housing; and means for biasing said receiving means such that said receiving means pivots between a first and a second position.

Additionally, in accordance with yet another embodiment of the present invention, an apparatus for storage and retrieval of recording medium includes means for damping said biasing means such that the receiving means pivots between the first and second positions at a damped speed. Moreover, in accordance with a further embodiment of the present invention, an apparatus for storage and retrieval of recording medium includes means for latching the receiving means to the housing in the second position such that the receiving means is fixedly positioned at the second position.

These and other features and advantages of the present invention will be understood upon consideration of the following detailed description of the invention and the accompanying drawings.

DETAILED DESCRIPTION OF THE PREFERRED EMBODIMENTS

Figure 1:
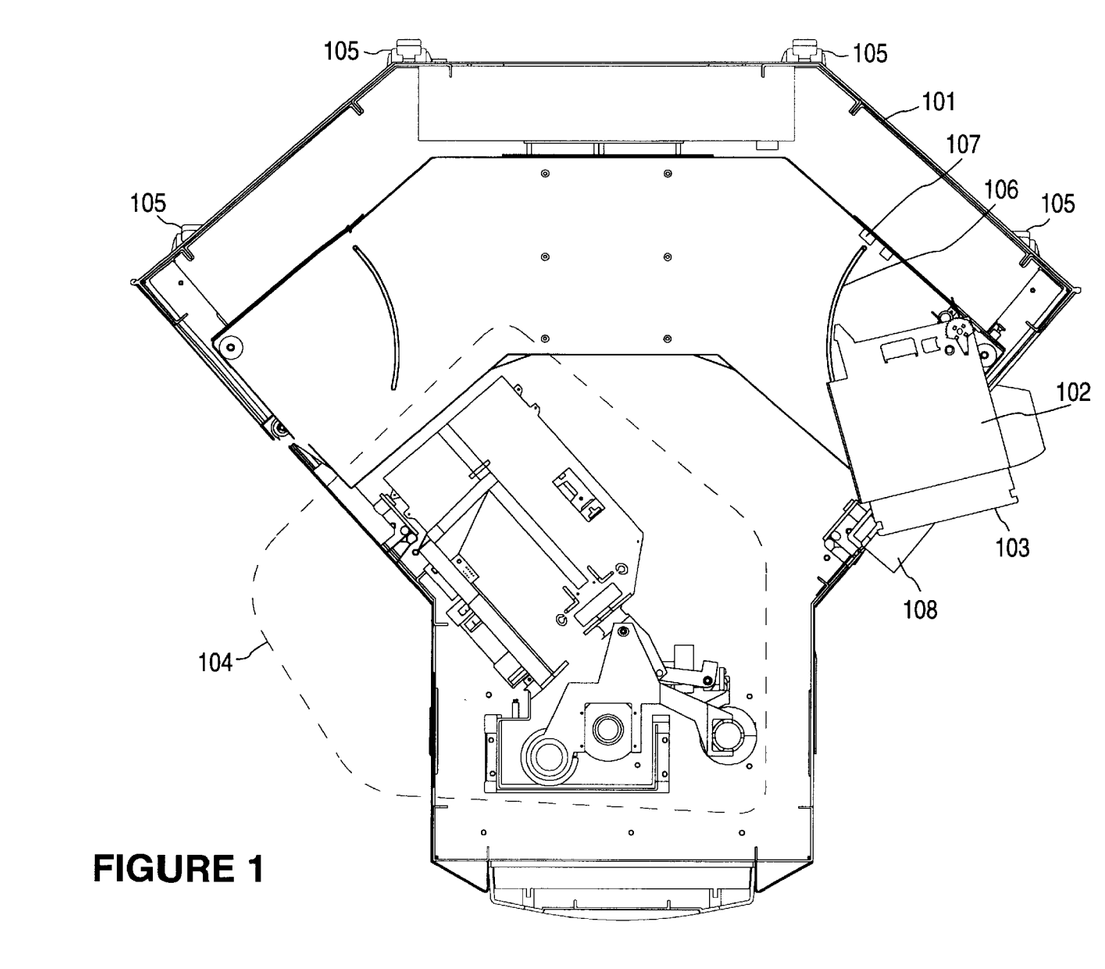
FIG. 1 illustrates an optical storage library with pivoting mailbox in accordance with one embodiment of the present invention.

FIG. 1 illustrates an optical storage library in accordance with one embodiment of the present invention. As shown, there is provided a housing 101, a pivoting mailbox 102, a disc cartridge 103 engaged with the pivoting mailbox 102 and a mechanical disc cartridge displacer 104 in the housing 101. While not shown, in accordance with the present invention, the same pivoting mailbox 102 can additionally be coupled to the housing 101 on the substantially left side rather than on the right side as illustrated in FIG. 1.

Within the optical storage library, there is provided an arc-shaped mailbox guide track 106 which is configured to guide the movement of the mailbox 102 into and out of the storage library 101. Moreover, in accordance with the present invention, there are provided wheels 105 at the bottom of the housing 101 of the optical storage library to facilitate relocation of the optical storage library with ease and speed. Also shown in FIG. 1 is an optical storage library housing panel 108 which is biased with spring or like means, and which is pivotally provided on the storage library housing to substantially cover the opening on the storage library housing 101 provided for the mailbox 102 to prevent dust or other contaminants or unwanted air particles to enter the optical storage library.

Figure 2:
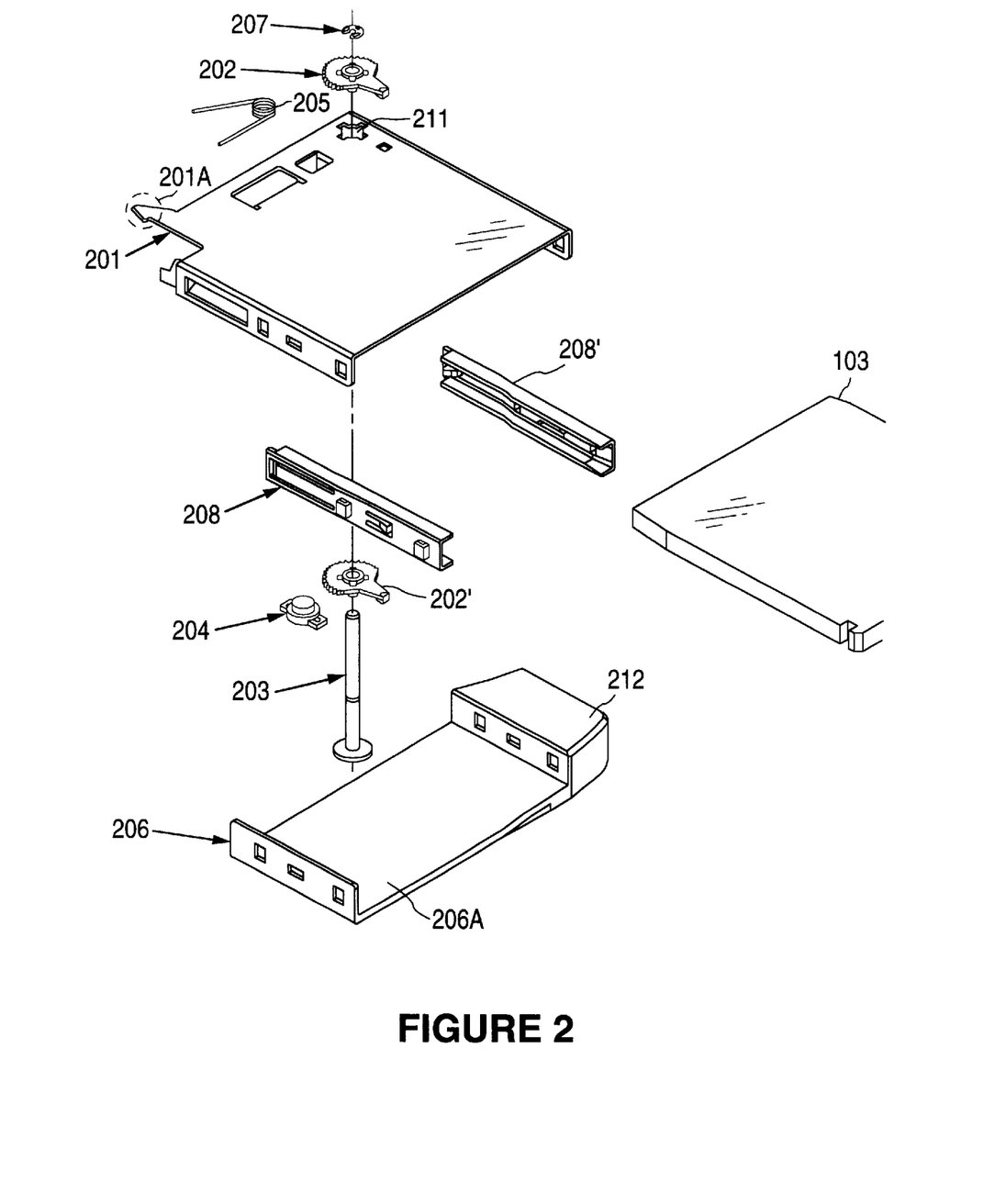
FIG. 2 illustrates the disassembled parts of the pivoting mailbox in accordance with one embodiment of the present invention.

FIG. 2 illustrates the disassembled parts of the pivoting mailbox 102 and the disc cartridge 103 as shown in FIG. 1 in accordance with one embodiment of the present invention. For the sake of simplicity of discussion, part numbers for the same parts are retained among the various Figures.

As shown, there are provided a mailbox housing 201 with a latch end 201A, a plurality of gears 202, 202', a shaft 203, a damper 204, a spring 205, a slide 206 an e-ring 207 and two cartridge guides 208, 208'. There is also shown the disc cartridge 103 of FIG. 1.

The mailbox housing 201 shown in FIG. 2 has an opening 211 through which it receives the shaft 203. In turn, the shaft 203 operates to couple one of the gears 202' before engaging the mailbox housing 201. When the shaft 203 is engaged in the mailbox housing 201 through the opening 211, the shaft 203 is further engaged with the spring 205, the other gear 202, and the e-ring 207 which operates to hold the gear 202 and the spring 205 in place coupled to the shaft 203. In other words, the e-ring 207 operates to maintain the gear 202 such that it does not disengage from the mailbox housing 201 of the mailbox structure during repeated rotation.

At the lower surface of the mailbox housing 201 is provided an arc-shaped groove (FIG. 1) which tracks the arc-shaped mailbox guide track 106 in so as to maintain the pivoting movement of the mailbox structure along the arc-shaped track. At one end of the mailbox housing 201 is a protrusion of the upper surface portion of the mailbox housing 201 defining the latch end 201A having a tapering end on one side such that it is configured to mount to a respective latch receiving portion 107 (FIG. 1) in the optical storage library retrieval system.

Also, the gears 202, 202' have teeth along a large portion of their peripheries for engaging with a similar set of gears mounted on the optical storage library (not shown).

The cartridge guides 208, 208' couple to the inner side of each side of the mailbox housing 201 respectively, such that it is configured to receive the disc cartridge 103. Moreover, the slide 206 with a handle portion 212 is coupled to the lower end of the mailbox housing 201 such that the handle portion 212 protrudes from one of the sides of the mailbox housing 201 such that a user can easily maintain a grip on the mailbox structure by way of gripping on the handle portion 212. Moreover, the damper 204 is coupled to the inner surface 206A of the slide 206 relative to the position of the gear 202' in the mailbox housing 201. In this manner, irrespective of the amount of re-coil force of the spring 205 the mailbox structure experiences, the damper 204 dampens the pivotal movement of the mailbox structure such as to avoid the mailbox structure pivoting about the shaft 203 too quickly.

Figure 3:
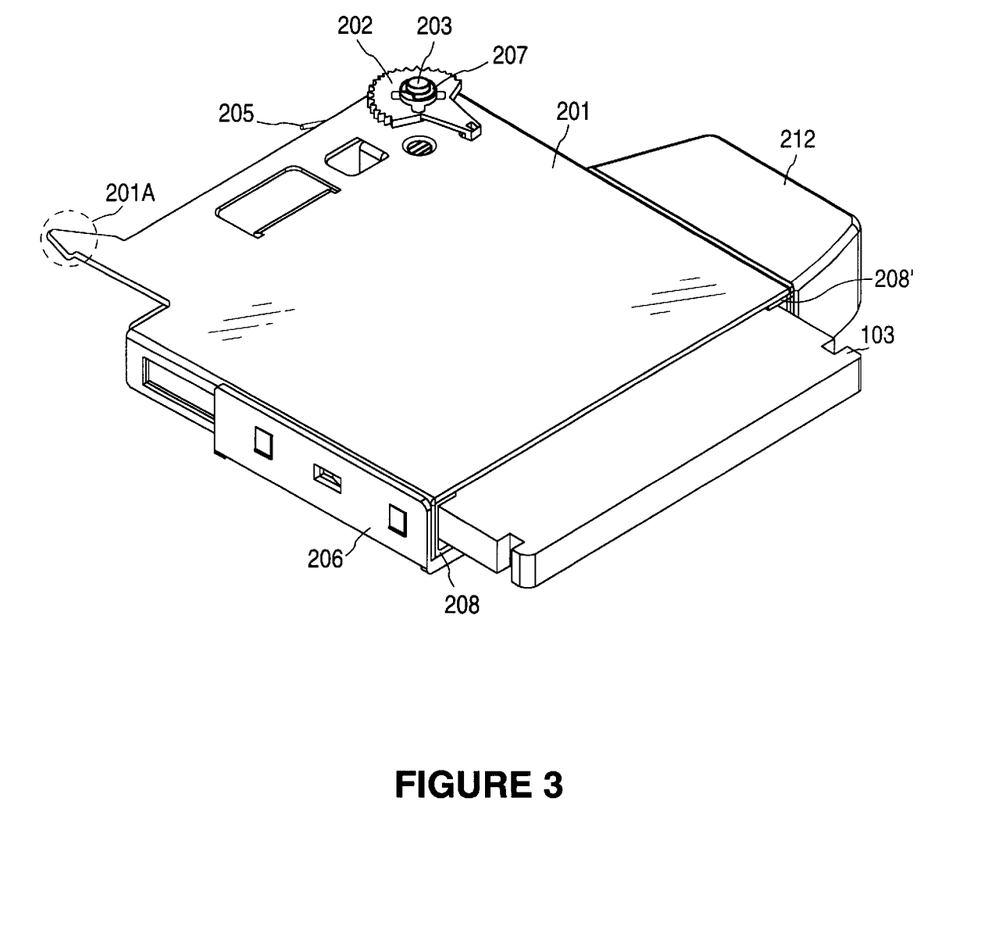
FIG. 3 illustrates a perspective view of the pivoting mailbox in accordance with one embodiment of the present invention.
Figure 4:
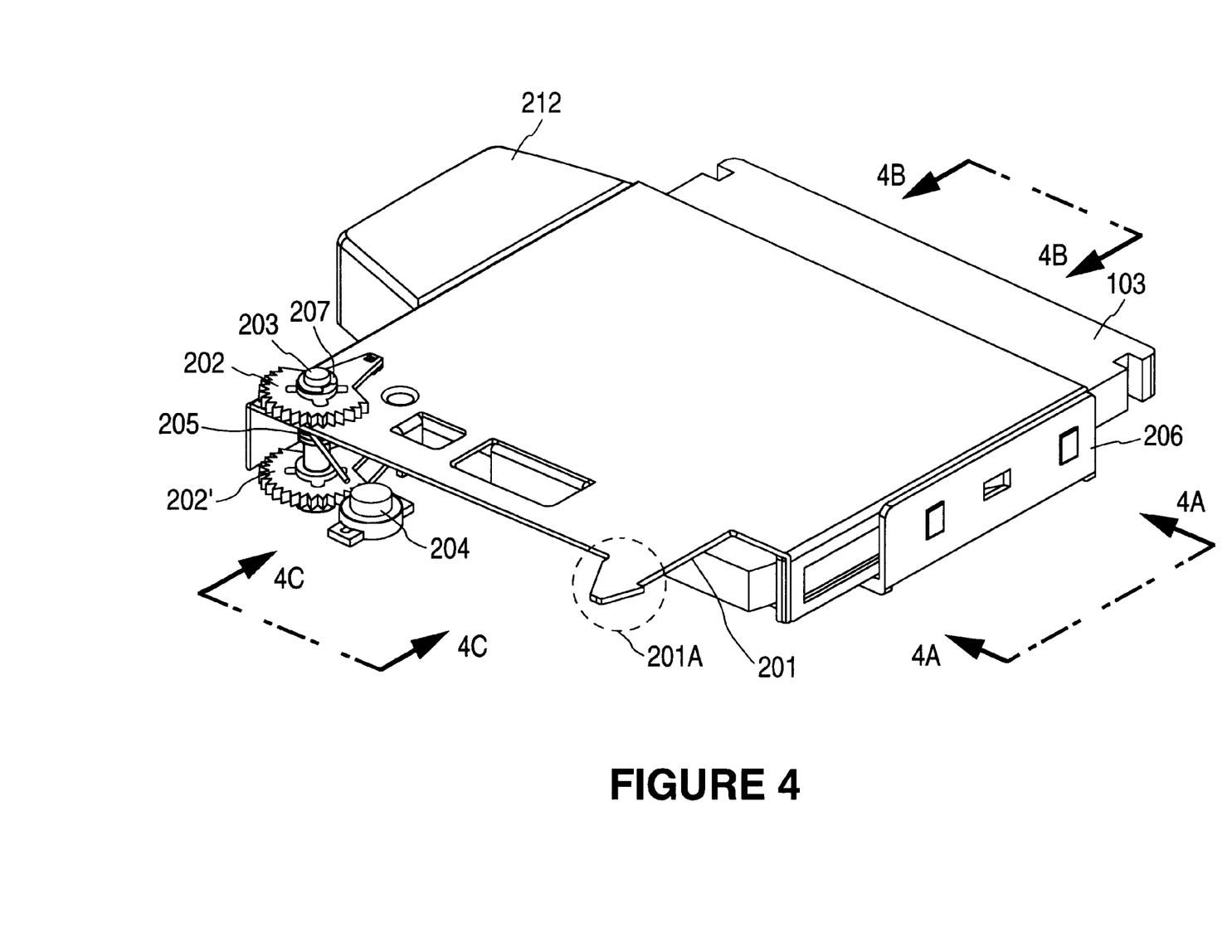
FIG. 4 illustrates another perspective view of the pivoting mailbox in accordance with one embodiment of the present invention.

FIGS. 3 and 4 illustrate perspective views of assembled mailbox structure 102 (FIG. 1) in accordance with one embodiment of the present invention. Both FIGS. 3 and 4 show the disc 103 partially coupled within the mailbox housing 201. Also, it can be seen that one of the gears 202, the e-ring 207 and the spring 205 are engaged with the shaft 203 through the opening 211 (FIG. 2) of the mailbox housing 201.

Moreover, FIG. 2 shows that the cartridge guides 208, 208' in assembled position are coupled to the inner portion of the mailbox housing 201 so as to facilitate receiving and/or ejecting the disc cartridge 103. Also, in FIG. 4 the cooperation of the damper 204 with the gear 202' is illustrated.

Figure 5:
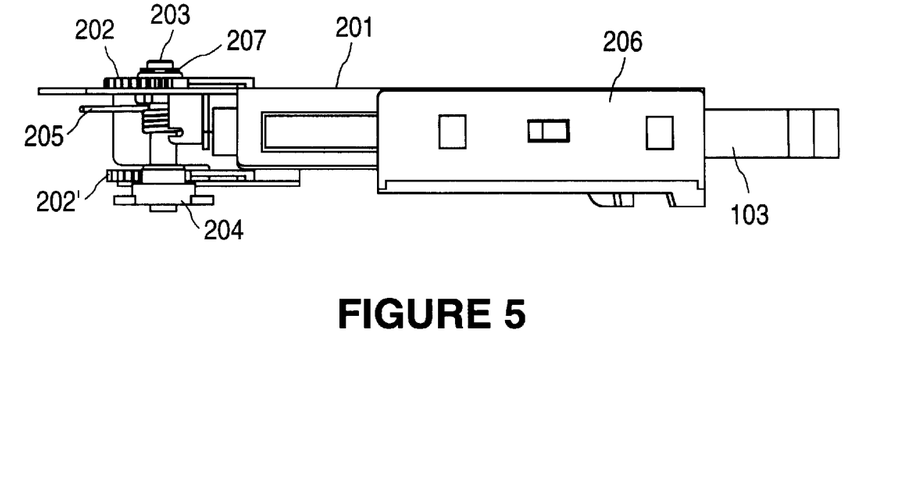
FIG. 5 is back section view taken along the plane designated 4A—4A FIG. 4.
Figure 6:
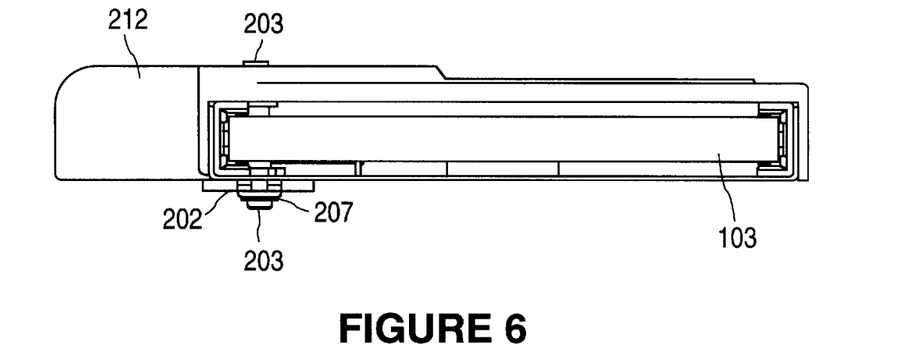
FIG. 6 is a side section view taken along the plane designated 4B—4B of FIG. 4.
Figure 7:
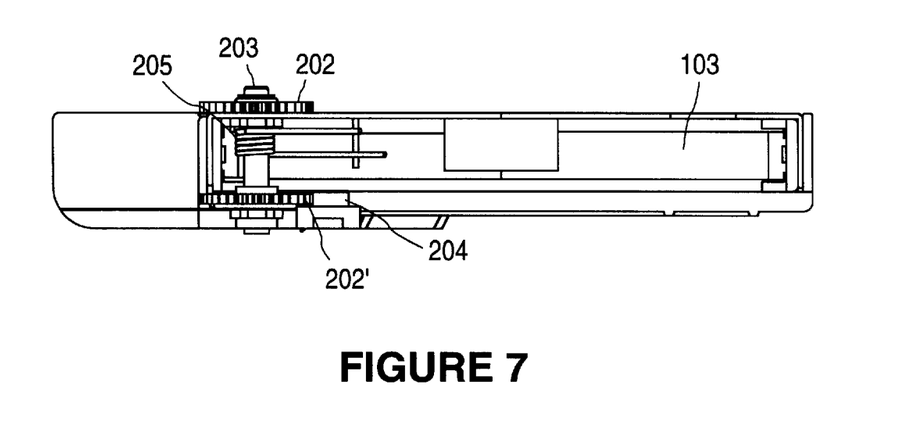
FIG. 7 is a front view taken along the plane designated 4C—4C of FIG. 4.

FIGS. 5–7 illustrate the views of the mailbox structure from perspectives 4A—4A, 4B—4B, and 4C—4C respectively, of FIG. 4.

Figure 8A:
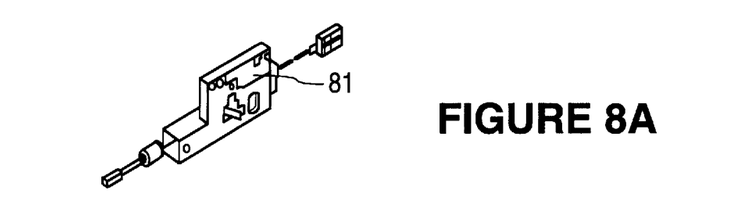
FIGS. 8A–8C illustrate a latch assembly, the latch assembly coupled to the optical storage library with the mailbox opened and closed, respectively, in accordance with the present invention.
Figure 8B:
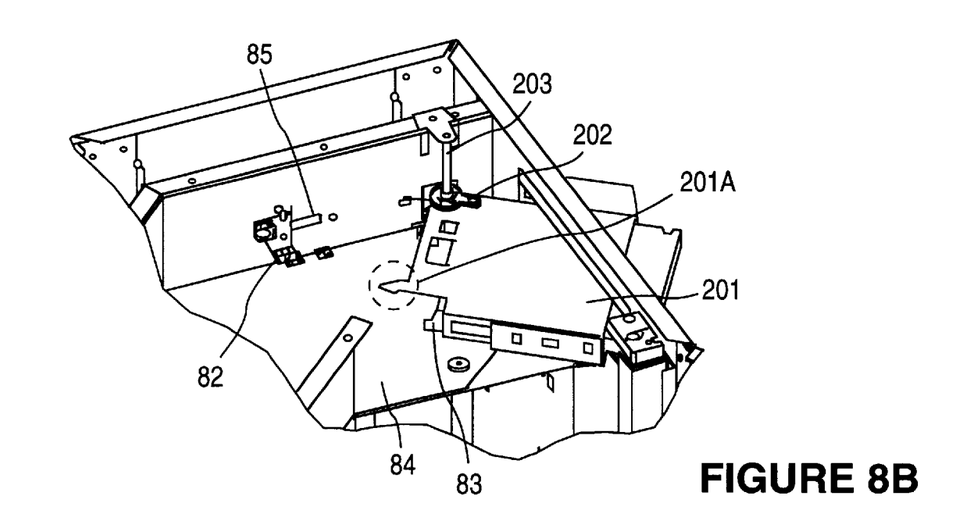
Figure 8C:
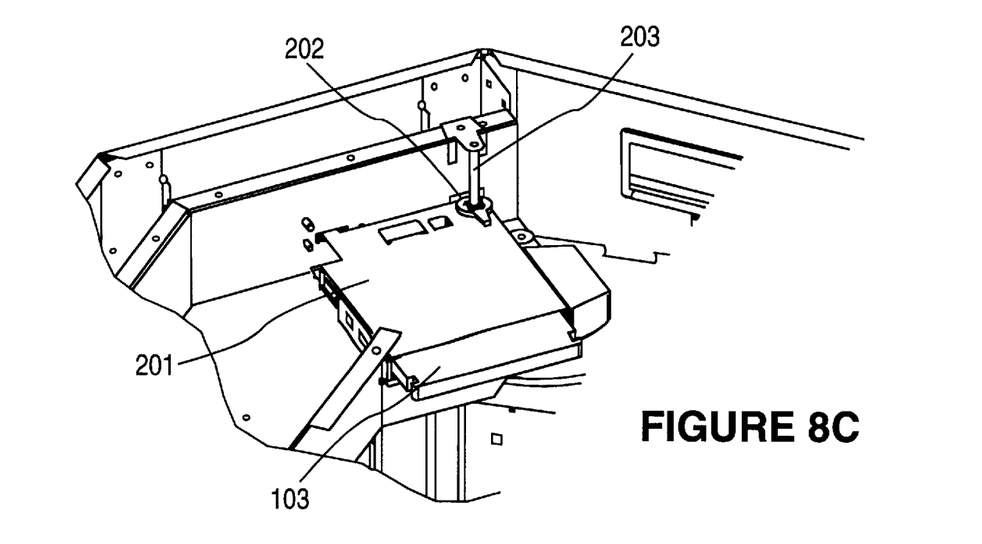

FIGS. 8A–8C illustrate a latch assembly, the latch assembly coupled to the optical storage library with the mailbox opened and closed, respectively, in accordance with the present invention. As shown, the latch assembly 8A is provided with a substantially rectangular socket 81 formed between two holes on the substantially upper right corner of the latch assembly 8A such that the latch end 201A of the mailbox housing 201 (FIG. 2) substantially fits through the rectangular socket. It is to be noted further that while this embodiment of the present invention illustrates a rectangular shaped socket 81, depending upon the shape of the latch end 201A of the mailbox housing 201, the rectangular shaped socket can be modified accordingly within the scope of the present invention.

FIGS. 8B and 8C illustrate the latch mechanism 8A coupled to the optical storage library with the pivoting mailbox 102 in open and closed position, respectively. There is provided a socket or a latch receiving portion 85 on the optical storage library as shown in FIG. 8B whose shape is substantially conformed to the shape of the rectangular socket 81 on the latch mechanism 8A in accordance with the present invention. Further, as shown, the pivoting mailbox 102 is provided with a flag 83 coupled to the bottom portion of the mailbox housing 201 substantially lining up with the latch end 201A. When the pivoting mailbox is in closed position, the flag 83 couples to a sensor 82 mounted to one edge of the cartridge magazine 84 such that it senses whether the disc cartridge 103 is loaded into the pivoting mailbox 102. In accordance with one embodiment of the present invention, the sensor 82 is substantially U-shaped such that when it receives the flag 83 (pivoting mailbox 102 in closed position), the magnetic field within the U-shaped sensor 82 breaks, sensing that the disc cartridge 103 is loaded into the pivoting mailbox 102.

During operation, the user depresses an open switch (not shown) separately provided on the disc cartridge storage and retrieval system such that the spring 205 pivotally mounted on the housing 201 is disengaged from its compressed state such that its re-coil force pushes the mailbox pivotally along the shaft 203 such that most of the opening of the housing is exposed to the user. In this manner, the user can load or unload the disc cartridge 103 into or from the mailbox 102 for placement into the magazine by a robotic control system 104 (FIG. 1).

Furthermore, as illustrated above, in accordance with the present invention, there is provided a damper 204 (FIG. 2) on the optical storage library is such that when the user depresses the open switch to release the mailbox from its re-coil position, the mailbox protrudes from the inside of the optical disc cartridge storage and retrieval system in a substantially controlled manner at a consistent and linear speed.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus for storage and retrieval of a recording media, comprising:
    a shaft mounted to a housing;
    a spring mounted to the shaft;
    a gear mounted to the shaft, the gear configured to pivot about the shaft in accordance with a bias of the spring; and
    a mailbox pivotally mounted to the shaft, the mailbox configured to pivot between first and second positions in accordance with the bias of the spring upon the gear.

2. The apparatus of claim 1 further comprising a damper coupled to the mailbox configured to dampen the bias of the spring mounted to the shaft.

3. The apparatus of claim 2 wherein the housing includes a guide track for guiding the displacement of the mailbox between the first and second positions.

4. The apparatus of claim 3 wherein the guide track is provided in a substantial curvature such that the mailbox is configured to pivot along the guide track between the first and second positions.

5. The apparatus of claim 4 further comprising a panel coupled to the apparatus configured to substantially cover an opening portion on the housing.

6. The apparatus of claim 5 wherein the panel is pivotally mounted on the housing along a first edge such that the panel is configured to rotate about the first edge.

7. The apparatus of claim 6 wherein the first edge of the panel is its lower horizontal edge.

8. The apparatus of claim 7 further including a latch provided such that when the mailbox is positioned at the second position, the latch fixedly catches a latch receiving portion provided on the housing into a secure position.

9. The apparatus of claim 5 further including a latch provided such that when the mailbox is positioned at the second position, the latch fixedly catches a latch receiving portion provided on the housing into a secure position.

10. The apparatus of claim 3 further comprising a panel coupled to the apparatus configured to substantially cover an opening portion on the housing.

11. The apparatus of claim 10 further including a latch provided such that when the mailbox is positioned at the second position, the latch fixedly catches a latch receiving portion provided on the housing into a secure position.

12. The apparatus of claim 10 wherein the panel is pivotally mounted on the housing along a first edge such that the panel is configured to rotate about the first edge.

13. The apparatus of claim 12 wherein the first edge of the panel is its lower horizontal edge.

14. The apparatus of claim 13 further including a latch provided such that when the mailbox is positioned at the second position, the latch fixedly catches a latch receiving portion provided on the housing into a secure position.

15. The apparatus of claim 1 wherein the housing includes a guide track for guiding the displacement of the mailbox between the first and second positions.

16. The apparatus of claim 15 wherein the guide track is provided in a substantial curvature such that the mailbox is configured to pivot along the guide track between the first and second positions.

17. The apparatus of claim 16 further including a panel coupled to the apparatus configured to substantially cover an opening portion on the housing.

18. The apparatus of claim 17 wherein the panel is pivotally mounted on the housing along a first edge such that the panel is configured to rotate about the first edge.

19. The apparatus of claim 18 wherein the first edge of the panel is its lower horizontal edge.

20. The apparatus of claim 17 further including a latch provided such that when the mailbox is positioned at the second position, the latch fixedly catches a latch receiving portion provided on the housing into a secure position.

21. The apparatus of claim 15 further comprising a panel coupled to the apparatus configured to substantially cover an opening portion on the housing.

22. The apparatus of claim 21 wherein the panel is pivotally mounted on the housing along a first edge such that the panel is configured to rotate about the first edge.

23. The apparatus of claim 22 wherein the first edge of the panel is its lower horizontal edge.

24. The apparatus of claim 23 further including a latch provided such that when the mailbox is positioned at the second position, the latch fixedly catches a latch receiving portion provided on the housing into a secure position.

25. The apparatus of claim 21 further including a latch provided such that when the mailbox is positioned at the second position, the latch fixedly catches a latch receiving portion provided on the housing into a secure position.

26. The apparatus of claim 1 further including a panel coupled to the apparatus configured to substantially cover an opening portion on the housing.

27. The apparatus of claim 26 wherein the panel is pivotally mounted on the housing along a first edge such that the panel is configured to rotate about the first edge.

28. The apparatus of claim 27 wherein the first edge of the panel is its lower horizontal edge.

29. The apparatus of claim 26 further including a latch provided such that when the mailbox is positioned at the second position, the latch fixedly catches a latch receiving portion provided on the housing into a secure position.

30. The apparatus of claim 1 further including a latch provided such that when the mailbox is positioned at the second position, the latch fixedly catches a latch receiving portion provided on the housing into a secure position.

31. A method of providing storage and retrieval of recording media, comprising the steps of:
    mounting a shaft to a housing;
    mounting a spring to the shaft;
    mounting a gear to the shaft, the gear for pivoting about the shaft in accordance with a bias of the spring; and
    pivotally mounting a mailbox to the shaft, the mailbox configured to pivot between first and second positions in accordance with the bias of the spring upon the gear.

32. The method of claim 31 further comprising the step of coupling a damper to the mailbox, the damper configured to dampen the bias of the spring mounted to the shaft.

33. The method of claim 32 further including the step of providing a guide track for guiding the displacement of the mailbox between the first and second positions.

34. The method of claim 33 wherein the step of providing the guide track includes providing the guide track in a substantial curvature such that the mailbox pivots along the guide track between the first and second positions.

35. The method of claim 34 further including the step of coupling a panel to the apparatus configured to substantially cover an opening portion on the housing.

36. The method of claim 35 wherein the step of coupling the panel includes the step of pivotally mounting the panel on the housing along a first edge such that the panel is configured to rotate about the first edge.

37. The method of claim 36 wherein the first edge of the panel is its lower horizontal edge.

38. The method of claim 37 further including the step of providing a latch such that when the mailbox is positioned at the second position, the latch fixedly catches a latch receiving portion provided on the housing into a secure position.

39. The method of claim 35 further including the step of providing a latch such that when the mailbox is positioned at the second position, the latch fixedly catches a latch receiving portion provided on the housing into a secure position.

40. The method of claim 33 further including the step of coupling a panel to the apparatus configured to substantially cover an opening portion on the housing.

41. The method of claim 40 wherein the step of coupling the panel includes the step of pivotally mounting the panel on the housing along a first edge such that the panel is configured to rotate about the first edge.

42. The method of claim 41 wherein the first edge of the panel is its lower horizontal edge.

43. The method of claim 42 further including the step of providing a latch such that when the mailbox is positioned at the second position, the latch fixedly catches a latch receiving portion provided on the housing into a secure position.

44. The method of claim 40 further including the step of providing a latch such that when the mailbox is positioned at the second position, the latch fixedly catches a latch receiving portion provided on the housing into a secure position.

45. The method of claim 31 further including the step of providing a guide track for guiding the displacement of the mailbox between the first and second positions.

46. The method of claim 45 wherein the step of providing the guide track includes providing the guide track in a substantial curvature such that the mailbox pivots along the guide track between the first and second positions.

47. The method of claim 46 further including the step of coupling a panel to the apparatus configured to substantially cover an opening portion on the housing.

48. The method of claim 47 wherein the step of coupling the panel includes the step of pivotally mounting the panel on the housing along a first edge such that the panel is configured to rotate about the first edge.

49. The method of claim 48 wherein the first edge of the panel is its lower horizontal edge.

50. The method of claim 47 further including the step of providing a latch such that when the mailbox is positioned at the second position, the latch fixedly catches a latch receiving portion provided on the housing into a secure position.

51. The method of claim 45 further including the step of coupling a panel to the apparatus configured to substantially cover an opening portion on the housing.

52. The method of claim 51 wherein the step of coupling the panel includes the step of pivotally mounting the panel on the housing along a first edge such that the panel is configured to rotate about the first edge.

53. The method of claim 52 wherein the first edge of the panel is its lower horizontal edge.

54. The method of claim 53 further including the step of providing a latch such that when the mailbox is positioned at the second position, the latch fixedly catches a latch receiving portion provided on the housing into a secure position.

55. The method of claim 51 further including the step of providing a latch such that when the mailbox is positioned at the second position, the latch fixedly catches a latch receiving portion provided on the housing into a secure position.

56. The method of claim 31 further including the step of coupling a panel to the apparatus configured to substantially cover an opening portion on the housing.

57. The method of claim 56 wherein the step of coupling the panel includes the step of pivotally mounting the panel on the housing along a first edge such that the panel is configured to rotate about the first edge.

58. The method of claim 57 wherein the first edge of the panel is its lower horizontal edge.

59. The method of claim 58 further including the step of providing a latch such that when the mailbox is positioned at the second position, the latch fixedly catches a latch receiving portion provided on the housing into a secure position.

60. The method of claim 31 further including the step of providing a latch such that when the mailbox is positioned at the second position, the latch fixedly catches a latch receiving portion provided on the housing into a secure position.

61. An apparatus for storage and retrieval of recording media, comprising:
   housing means having mounted thereon a shaft;
   spring means mounted to the shaft; and
   gear means coupled to said housing means and said spring means;
      wherein said housing means is configured to pivot between first and second positions in accordance with the bias of said spring means upon said gear means.

62. The apparatus of claim 61 further comprising damping means coupled to said housing means configured to dampen the bias of the spring means.

63. The apparatus of claim 61 wherein the housing means includes a guide means for guiding the displacement of the housing means between the first and second positions.

64. The apparatus of claim 63 wherein said guide means is provided in a substantial curvature such that the housing means is configured to pivot along the guide means between the first and second positions.

65. The apparatus of claim 63 further comprising panel means coupled to the apparatus configured to substantially cover an opening portion of said housing means.

66. The apparatus of claim 65 wherein said panel means is pivotally mounted on the apparatus along a first edge such that the panel is configured to rotate about the first edge.

67. The apparatus of claim 66 wherein the first edge of said panel means is its lower horizontal edge.

68. The apparatus of claim 65 further including latch means provided such that when said housing means is positioned at the second position, said latch means fixedly catches a latch receiving portion provided on the apparatus into a secure position.

69. The apparatus of claim 61 further including panel means coupled to the apparatus configured to substantially cover an opening portion of said housing means.

70. The apparatus of claim 69 wherein said panel means is pivotally mounted on the apparatus along a first edge such that the panel is configured to rotate about the first edge.

71. The apparatus of claim 70 wherein the first edge of said panel means is its lower horizontal edge.

72. The apparatus of claim 69 further including latch means provided such that when said housing means is positioned at the second position, said latch means fixedly catches a latch receiving portion provided on the apparatus into a secure position.

73. The apparatus of claim 61 further including latch means provided such that when said housing means is positioned at the second position, said latch means fixedly catches a latch receiving portion provided on the apparatus into a secure position.

* * * * *